United States Patent [19]

Martin et al.

[11] Patent Number: 4,671,052
[45] Date of Patent: Jun. 9, 1987

[54] ROTARY LAWN MOWER WITH REARWARD FOOT GUARD ASSEMBLY

[75] Inventors: Herman H. Martin, Westerville, Ohio; Earl H. Kidd, deceased, late of Galesburg, Ill., by Grace E. T. Kidd, executor

[73] Assignee: Outboard Marine Corporation, Waukegan, Ill.

[21] Appl. No.: 246,229

[22] Filed: Mar. 23, 1981

[51] Int. Cl.[4] .......................... A01D 53/02
[52] U.S. Cl. .......................... 56/17.4; 56/320.2
[58] Field of Search ............. 56/16.7, 17.1, 17.2, 56/17.4, 17.5, 320.1, 320.2, DIG. 24, 255

[56] References Cited

U.S. PATENT DOCUMENTS

| | | | |
|---|---|---|---|
| 2,857,725 | 10/1958 | Canfield | 56/320.1 |
| 2,982,079 | 5/1961 | Schesser | 56/320.2 |
| 3,385,041 | 5/1968 | Douglas | 56/320.2 |
| 3,727,386 | 4/1973 | Jespersen | 56/320.1 |
| 3,753,341 | 8/1973 | Berg | 56/17.5 |
| 3,918,242 | 11/1975 | Harris | 56/16.7 |
| 4,015,407 | 4/1977 | Bacon | 56/17.2 |
| 4,134,249 | 1/1979 | Wuerker et al. | 56/17.4 |
| 4,224,785 | 9/1980 | Hoch | 56/320.1 |
| 4,241,567 | 12/1980 | Carolan | 56/320.1 |

FOREIGN PATENT DOCUMENTS

| | | | |
|---|---|---|---|
| 878217 | 8/1971 | Canada | 56/17.4 |
| 1270634 | 7/1960 | France | 56/17.5 |
| 725898 | 3/1955 | United Kingdom | 56/17.4 |
| 1205812 | 9/1970 | United Kingdom | 56/17.5 |
| 2037558 | 7/1980 | United Kingdom | 56/17.5 |

Primary Examiner—Gene Mancene
Assistant Examiner—John G. Weiss
Attorney, Agent, or Firm—Michael, Best & Friedrich

[57] ABSTRACT

A lawn mower comprises a housing enclosing a rotary cutting blade and including a downwardly depending sidewall which extends radially outwardly of the path of cutting blade rotation and includes a rearward section having a lower edge which extends generally adjacent to the plane of cutting blade rotation and generally transversely of the direction of intended mower travel. A rearward foot guard assembly is carried by the housing and includes a portion which rigidly extends below and outwardly of the rearward section lower edge to prevent operator foot contact with the mower blade.

6 Claims, 8 Drawing Figures

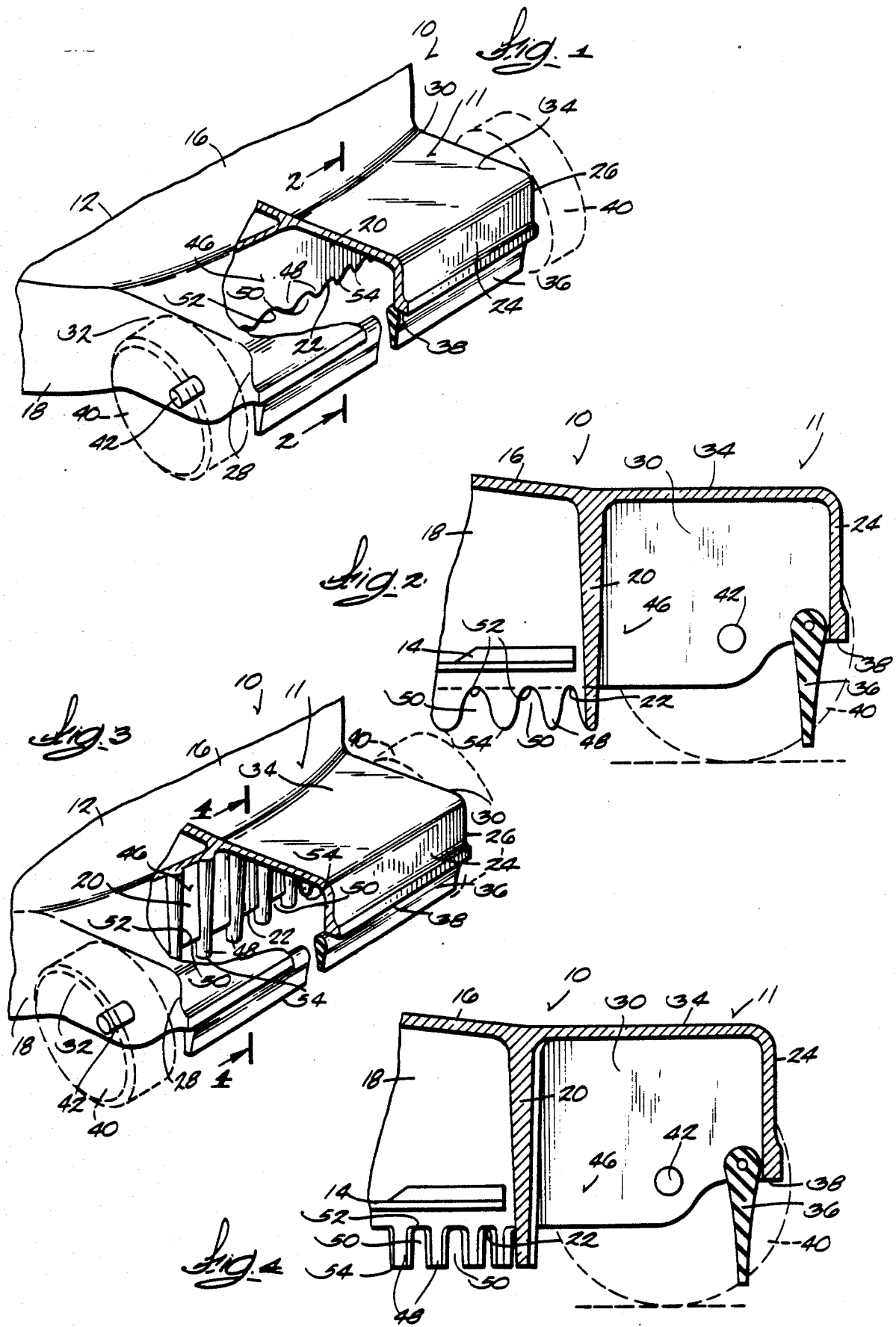

U.S. Patent  Jun. 9, 1987  Sheet 2 of 2  4,671,052
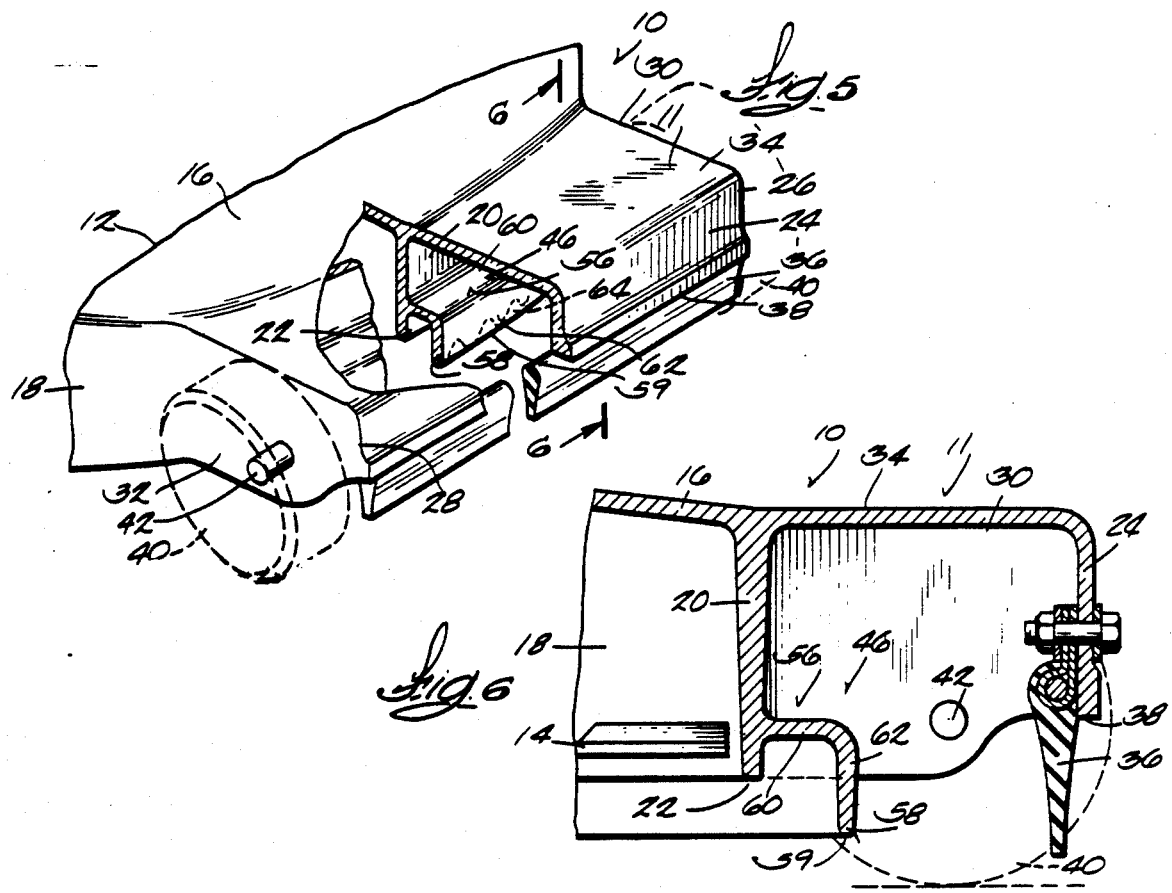
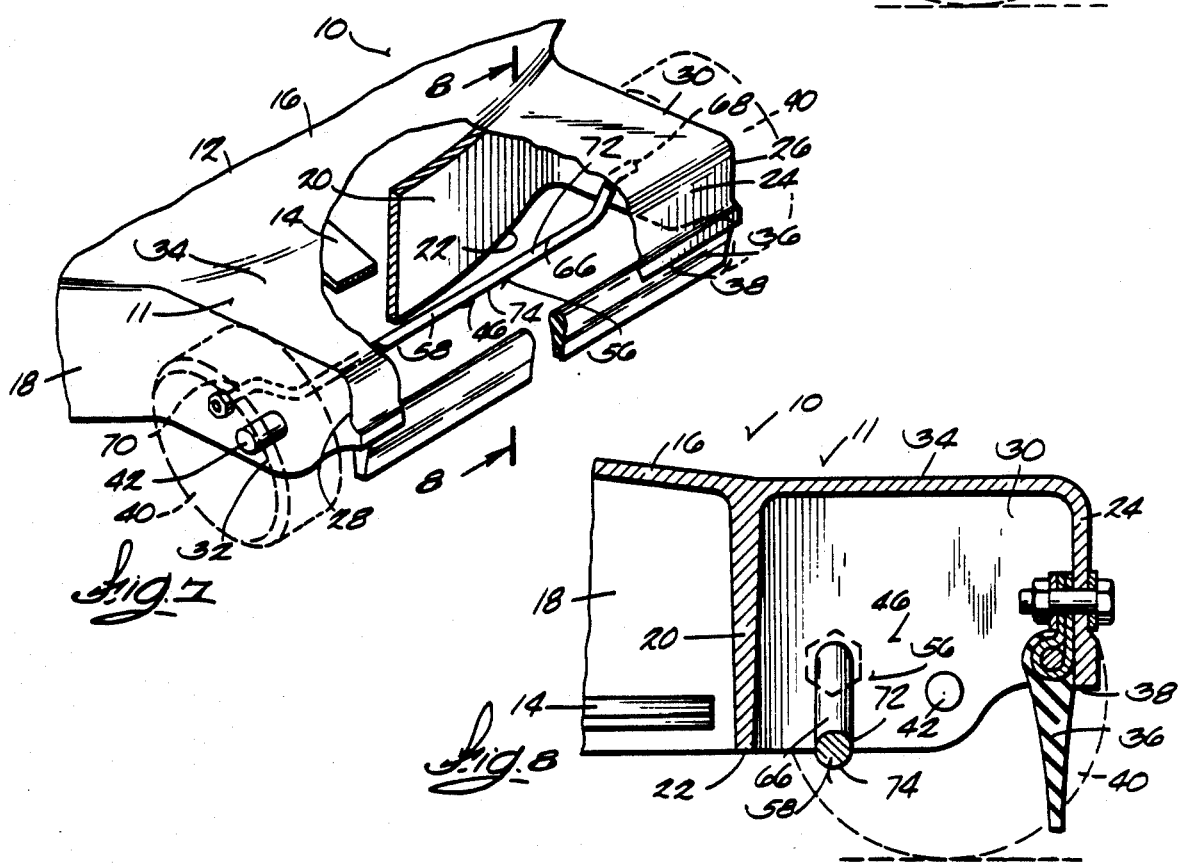

ROTARY LAWN MOWER WITH REARWARD FOOT GUARD ASSEMBLY

BACKGROUND OF THE INVENTION

This invention generally relates to rotary lawn mowers. More specifically, the invention relates to rotary lawn mowers having protective guards or shields which prevent operator contact with the rotary cutting blades.

DESCRIPTION OF THE PRIOR ART

Attention is directed to the following U.S. patents in which various protective guards arrangements used in connection with rotary lawn mowers are disclosed:

| | | |
|---|---|---|
| Phelps | 2,265,545 | December 9, 1941 |
| Daggett | 2,557,598 | June 19, 1951 |
| Pols | 2,565,598 | August 21, 1951 |
| Estes | 2,963,842 | December 13, 1960 |
| Curran et al | 3,024,586 | March 13, 1962 |
| Teachworth | 3,098,337 | July 23, 1963 |
| Machovina | 3,481,124 | December 2, 1969 |
| Dacus et al | 3,680,294 | August 1, 1972 |
| Rutherford | 3,680,295 | August 1, 1972 |
| Thorud et al | 3,750,378 | August 7, 1973 |
| Sotak et al | 3,783,591 | January 8, 1974 |
| Dahl | 3,799,579 | March 26, 1974 |
| Marmeker et al | 3,927,513 | December 23, 1975 |
| Christopherson | 4,030,277 | June 21, 1977 |
| Rutherford | 4,107,907 | August 22, 1978 |
| Wuerker et al | 4,134,249 | January 16, 1979 |

SUMMARY OF THE INVENTION

The invention provides a lawn mower comprising a housing enclosing a rotary cutting blade. The housing includes a downwardly depending sidewall which extends radially outwardly from the path of cutting blade rotation. The sidewall includes a rearward section having a lower edge extending generally adjacent to the plane of cutting blade rotation and generally transversely of the direction of intended mower travel. A rod member is carried by the housing. The rod member includes a portion which rigidly extends adjacently below and outwardly of the rearward section lower edge and serves to prevent accidental contact between the operator's foot and the cutting blade.

The invention also provides a lawn mower comprising a housing enclosing a rotary cutting blade and including a downwardly depending sidewall extending radially outwardly of the path of cutting blade rotation. The sidewall includes a rearward section having a lower edge extending generally adjacent to the plane of cutting blade rotation. A downwardly depending rear panel having opposite ends is spaced outwardly from the rearward sidewall section generally transversely of the direction of intended mower travel. Side panels respectively extend between the rear panel ends and the rearward sidewall section, and a rearward pair of wheels is supported by the side panels for rotation about an axis fixed relative to the side panels. A member extends between the side panels intermediate the rearward sidewall section and the axis of rotation of the rearward pair of wheels. The member includes a portion extending adjacently below and outwardly of the rearward section lower edge to prevent accidental contact between the operator's foot and the cutting blade.

In one embodiment, the member includes a wall extending generally horizontally outwardly from the rearward sidewall section adjacent to the lower edge thereof and a lip depending downwardly from the wall and including the member portion which prevents accidental contact with the cutting blade.

In one embodiment, a plurality of horizontally spaced openings are formed along the lip portion to reduce drag occasioned by movement of the lip through the grass.

The invention also provides a lawn mower comprising a housing enclosing a rotary cutting blade and including a downwardly depending sidewall extending radially outwardly of the path of cutting blade rotation. The sidewall includes a rearward section having a lower edge extending generally adjacent to the plane of cutting blade rotation. A plurality of vertical members extend downwardly from and are horizontally spaced along the rearward section lower edge to prevent accidental contact between the operator's foot and the cutting blade with a minimum of drag occasioned by movement through the grass.

One of the principal features of the invention is the provision of a lawn mower which includes a rearward foot guard assembly having a portion which rigidly extends adjacently below the rearward edge of the mower housing to prevent accidental operator contact with the mower blade from the rear of the housing.

Another one of the principal features of the invention is the provision of a lawn mower having a rearward foot guard assembly which prevents operator contact with the mower blade from the rear of the housing and which does so with a minimum of drag occasioned by movement of the assembly through the grass, particularly at low cutting heights.

Additional features of the invention will be apparent from the following general description, drawings, and appended claims.

DESCRIPTION OF THE DRAWINGS

FIG. 1 is a perspective view, with parts broken away and in section, of the rearward portion of a lawn mower which includes a rearward foot guard assembly embodying various of the features of the invention;

FIG. 2 is a side section view of the foot guard assembly taken generally along line 2—2 in FIG. 1;

FIG. 3 is a perspective view, with parts broken away and in section, of the rearward portion of a lawn mower which includes an alternate arrangement of the rearward foot guard assembly shown in FIG. 1;

FIG. 4 is a side section view of the foot guard assembly taken generally along line 4—4 in FIG. 3;

FIG. 5 is a perspective view, with parts broken away and in section, of the rearward portion of a lawn mower which includes a rearward foot guard assembly embodying various of the features of the invention;

FIG. 6 is a side section view of the foot guard assembly taken generally along line 6—6 in FIG. 5;

FIG. 7 is a perspective view, with parts broken away and in section, of the rearward portion of a lawnmower which includes a rearward foot guard assembly embodying various of the features of the invention; and FIG. 8 is a side section view of the foot guard assembly taken generally along line 8—8 in FIG. 7.

Before explaining the embodiments of the invention in detail, it is to be understood that the invention is not limited in its application to the details of the construction and the arrangement of components set forth in the following description or illustrated in the drawings. The invention is capable of other embodiments and of being practiced and carried out in various ways. Also it is to be understood that the phraseology and terminology being employed herein are for the purpose of description and should not be regarded as limiting.

GENERAL DESCRIPTION

Shown in the drawings is a lawn mower 10 which comprises a housing 12 enclosing a rotary cutting blade 14. The housing 12 includes a top deck 16 and a sidewall 18 which depends downwardly from the top deck 16 radially outwardly of the path of cutting blade rotation. The sidewall 18 includes a rearward section 20 having a lower edge 22 extending generally adjacent to the plane of cutting blade rotation and generally transversely of the direction of intended mower travel.

While various constructions are possible, in the illustrated embodiment, the mower 10 includes a rearward housing section 11. More particularly, the housing 12 includes a downwardly depending rear panel 24 having opposite ends 26 and 28. The rear panel 24 is spaced outwardly from the rearward sidewall section 20 and extends generally transversely of the direction of intended mower travel. Side panels 30 and 32 extend between each of the rear panel ends 26 and 28 and the rearward sidewall section 20. A top wall 34 extends horizontally across these side panels 30 and 32 and joins the top deck 16 of the housing 12. A shield member 36, typically made of a flexible material, may be pivotally attached along the lower edge 38 of the rear panel 24 to deflect objects which may be thrown by the rotary cutting blade 14.

The blade housing 12 is typically supported by a series of wheels for movement over the ground. In the illustrated construction, the lawn mower 10 includes a pair of rear wheels 40, each of which is mounted for rotation about an axle 42 located forward of the rear panel 24 and threaded into the adjacent side panel 32 and 34. Means (not shown) may be provided for selectively adjusting the vertical relationship of each wheel axle 42 with respect to the blade housing 12 to adjust the cutting height of the cutting blade 14.

A rearward foot guard assembly 46 is provided to prevent inadvertent slippage of an operator's foot beneath the rearward lower edge 22 of the mower 10. Such inadvertent slippage could occur, for example, while the mower 10 is being used to cut grass perpendicularly to the crest of a sloping terrain and could result in the operator's foot coming into contact with the rotary cutting blade 14. Various alternate embodiments of the rearward foot guard assembly 46 are shown in the drawings.

Referring first to FIGS. 1 through 4, the rearward foot guard assembly 46 takes the form of a plurality of vertical members 48 extending downwardly from and in a horizontally spaced relationship along the rearward section lower edge 22. This construction results in a series of horizontally spaced openings 50 which, depending upon the configuration desired, can take the shape of generally rectilinear notches (as in FIG. 3) or generally sinusoidal "scallops" (as in FIGS. 1 and 2). In either arrangement, the uppermost portion 52 of each opening 50 is generally coplanar with the lower edge 22 of the rearward sidewall section 20 (see FIGS. 2 and 4), and the lowermost portion 54 is closely spaced above the ground. In either arrangement, the downwardly extending vertical members 48 effectively block passage of the operator's foot beneath the lower edge 22 into the interior of the blade housing 12. The horizontally spaced relationship of the members 48 also serves to minimize drag occasioned by movement of the members 48 through the grass, particularly at low cutting heights.

Referring now to FIGS. 5 through 8, the rearward foot guard assembly 46 illustrated therein takes the form of a member 56 which extends between the side panels 30 and 32 intermediate the rearward sidewall section 20 and the axis of rotation (i.e. axle 42) of the rearward pair of wheels 40. The member 56 includes an edge portion 58 which extends adjacently below and outwardly of the rearward section lower edge 22. This edge portion 58, like the vertical members 48 shown in FIGS. 1 through 3, serves to block access into the interior portions of the blade housing 12 beneath the lower edge 22.

More particularly, and referring now only to the particular arrangement illustrated in FIGS. 5 and 6, the member 56 includes a wall 60 which extends generally horizontally outwardly from the rearward sidewall section 20 adjacent to its lower edge 22. A lip 62 depends downwardly from the wall 60 and includes a lower edge portion 59 which generally corresponds with the heretofore described edge portion 58.

The lip 62 also preferably includes means defining a plurality of horizontally spaced openings 64 in the lip edge portion 59 (shown in phantom lines in FIG. 5). Like the openings 50 shown in FIGS. 1 through 4, these openings 64 serve to reduce drag.

Referring now to the particular construction shown in FIGS. 7 and 8, the member 56 takes the form of a rod member 66 which extends generally parallel to the rear panel 24. The rod member 66 includes opposite end portions 68 and 70 respectively fixedly connected to the side panels 30 and 32 and an intermediate body portion 72 which extends between and is displaced below the opposite rod end portions 68 and 70. The body portion 72 includes a lower edge portion 74 generally corresponding with the heretofore described edge portion 58.

The rod member body portion 72 rigidly or immovably extends between the side panels 30 and 32 and blocks access into the interior portions of the blade housing 12 beneath the lower edge 22. Furthermore, due to its cylindrical shape, the rod member body portion 72 presents a relatively small surface area transverse the direction of mower travel, and thus does not generate an appreciable amount of drag during movement through the grass.

While all alternate embodiments of the rearward foot guard assembly 46 illustrated in FIGS. 1 through 8 are shown in connection with a mower 10 having a rearward housing section 11, it should be appreciated that the use of the rearward foot guard assembly 46 is not so limited. Each of the embodiments of the rearward foot guard assembly 46 may be utilized in lawn mowers having different housing constructions.

Various of the features of the invention are set forth in the following claims.

We claim:

1. A lawn mower comprising a housing enclosing a rotary cutting blade and including a downwardly depending sidewall extending radially outwardly of the path of cutting blade rotation and including a rearward section having a lower edge extending generally adjacent to the plane of cutting blade rotation and generally transversely of the direction of intended mower travel, and a rod member carried by said housing and including a portion extending adjacently below and outwardly of said rearward section lower edge and in immovable relation to said housing.

2. A lawn mower according to claim 1 wherein said housing includes a downwardly depending rear panel having opposite ends and spaced outwardly from said rearward sidewall section and extending generally transversely of the direction of intended mower travel, and side panels respectively extending between each of said rear panel ends and said rearward sidewall section, and wherein said rod member includes opposite end portions respectively connected to said side panels and an intermediate body portion extending between and displaced below said opposite rod end portions and including said portion extending adjacently below and outwardly of said rearward section lower edge.

3. A lawn mower according to claim 2 and further including a rearward pair of wheels supported by said side panels for rotation about an axis fixed relative to said side panels and extending intermediate said rear panel and said intermediate body portion of said rod member.

4. A lawn mower comprising a housing enclosing a rotary cutting blade and including a downwardly depending sidewall extending radially outwardly of the path of cutting blade rotation and including a rearward section having a lower edge extending generally adjacent to the plane of cutting blade rotation, a downwardly depending rear panel having opposite ends and spaced outwardly from said rearward sidewall section and generally transversely of the direction of intended mower travel, side panels respectively extending between said rear panel ends and said rearward sidewall section, a rearward pair of wheels supported by said side panels for rotation about an axis fixed relative to said side panels, and a member extending between said side panels intermediate said rearward sidewall section and said axis of rotation of said rearward pair of wheels, said member including a portion extending adjacently below and outwardly of said rearward section lower edge.

5. A lawn mower according to claim 4 wherein said member includes a wall extending generally horizontally outwardly from said rearward sidewall section adjacent to said lower edge thereof and a lip depending downwardly from said wall and including said portion of said member.

6. A lawn mower according to claim 5 wherein said lip includes a lower edge, and means defining a plurality of horizontally spaced openings in said lip lower edge.

* * * * *